(12) United States Patent
Mahalingaiah

(10) Patent No.: US 6,912,196 B1
(45) Date of Patent: Jun. 28, 2005

(54) COMMUNICATION NETWORK AND PROTOCOL WHICH CAN EFFICIENTLY MAINTAIN TRANSMISSION ACROSS A DISRUPTED NETWORK

(75) Inventor: Rupaka Mahalingaiah, Austin, TX (US)

(73) Assignee: Dunti, LLC, Austin, TX (US)

( * ) Notice: Subject to any disclaimer, the term of this patent is extended or adjusted under 35 U.S.C. 154(b) by 0 days.

(21) Appl. No.: 09/571,027

(22) Filed: May 15, 2000

(51) Int. Cl.$^7$ ............................................. H04L 12/26
(52) U.S. Cl. ..................................... 370/216; 370/355
(58) Field of Search ................................ 370/452, 352, 370/471–475, 355, 216, 389–395, 505–509, 401–410, 436, 516; 348/14.12; 709/218; 375/345–347, 267; 455/504, 272; 714/704

(56) References Cited

U.S. PATENT DOCUMENTS

| | | | |
|---|---|---|---|
| 4,679,191 A | * 7/1987 | Nelson et al. | 370/355 |
| 5,023,872 A | * 6/1991 | Annamalai | 714/704 |
| 5,095,480 A | 3/1992 | Fenner | |
| 5,319,644 A | * 6/1994 | Liang | 370/452 |
| 5,568,482 A | * 10/1996 | Li et al. | 370/471 |
| 5,721,819 A | 2/1998 | Galles et al. | |
| 6,119,171 A | 9/2000 | Alkhatib | |
| 6,643,286 B1 | * 11/2003 | Kapadia et al. | 370/389 |

OTHER PUBLICATIONS

Antonio et al., "A Fast Distributed Shortest Path Algorithm for a Class of Hierarchically Structured Data Networks," © 1989 IEEE, pp. 183–192.

* cited by examiner

*Primary Examiner*—Chi Pham
*Assistant Examiner*—Prenell Jones
(74) *Attorney, Agent, or Firm*—Kevin L. Daffer; Daffer McDaniel, LLP

(57) ABSTRACT

A packet architecture, communication system, and method are provided for determining the location at which a network is disrupted, disabled, and/or severed. The packet can contain control bits and error identification bits which note the location at which disturbance exists, and informs the originating module to take alternative path if necessary. The alternative path can be applied to either re-sending the existing packet or sending future packets between certain modules connected to the network, wherein the network preferably includes one or more ring topologies interconnected with one another between termination devices. The termination devices allow communication across subnets which form an intranet or across a global system, or internet. Although redundant transmission channels are used, each transmission channel preferably does not send redundant packets, nor are the transmission channels dedicated as uni-directional. Instead, each of the redundant transmission channels can send dissimilar packets in a bi-directional fashion.

18 Claims, 4 Drawing Sheets

| 00 | NO ERROR |
| 01 | FIRST ERROR DETECTED |
| 10 | ERROR ACK |
| 11 | DROP PACKET |

COMMUNICATION NETWORK AND PROTOCOL WHICH CAN EFFICIENTLY MAINTAIN TRANSMISSION ACROSS A DISRUPTED NETWORK

BACKGROUND OF THE INVENTION

1. Field of the Invention

This invention relates to a communication system ("network") that accommodates wrapped packets, each of which includes error control bits that, in conjunction with unique identifiers assigned to each module or switch connected to the network, detect the location at which the network is severed and yet maintains efficient transfers across the network.

2. Description of the Related Art

A communication network is generally regarded as an interconnected set of subnetworks or subnets. The network can extend over localized subnets as an intranet or can extend globally as an internet between one or more intranets. A communication network can therefore forward data within a localized network between termination devices extending to almost anywhere around the world. The termination devices include any data entry/retrieval system (e.g., telephone or computer), and a network includes a local and/or global interconnection of termination devices configured on one or more subnets.

Each subnet or interconnected set of subnets can be configured in various ways. For example, the subnets can be arranged in a ring, star, mesh and/or linear topology. Furthermore, the topography can accommodate various transmission protocols. A popular communication protocol includes the Transmission Control Protocol ("TCP") and the Internet Protocol ("IP"). Protocols such as TCP/IP determine how the termination devices will communicate with each other over the network that may be configured with or without internet connection.

Popular protocols such as TCP/IP deliver data across the network in the form of a packet. Each packet of a particular message may be sent across different routes of the network at the same time, and then reassembled at the proper termination device. In order to ensure the packets are properly received, certain layers of the popular Open System Interconnect ("OSI") protocol stack will wrap the data before the packet is sent across the network. For example, TCP can divide data into segments that are then placed into, for example, IP datagrams having a segment of data interposed between a header and a trailer. The combination of header, data segment, and trailer is interchangeably called the IP datagram or "packet." The IP datagram can be further wrapped using a Point-to-Point Protocol ("PPP"), a popular such protocol being that which follows the Ethernet specification at the physical layer. Thus, it is not until the data segment has been wrapped possibly numerous times will the packet be forwarded across the network.

Once the packet has been properly wrapped, it will in most instances be forwarded unhindered across the network. Unfortunately, however, transmission disruptions can often occur. Such might be the case where a transmission path of the network is severed, or otherwise temporarily or permanently disabled. If the disrupted path is in a critical segment of the network, it may be impossible to reroute a packet between termination devices while avoiding that path. Thus, even with networks having more than several alternative routes between a pair of termination devices, a disrupted critical route would disable the entire network transmission.

In an effort to obviate temporary or permanent network downtime resulting from a disturbed (i.e., corrupted, disabled, or severed) transmission path, many architectures use redundancy. For example, in a ring topology, transmission from one station to another station connected to the ring proceeds in a single direction around the ring. If the transmission channel is disturbed, transmissions between those stations can no longer take place if, indeed, those stations are separated by the disruption. Using a second, or "redundant," channel, redundant packets can be sent in both directions on both channels around the ring. Thus, if the left transmission channel is cut, the right transmission channel is able to maintain transmission in the right direction around the ring. In an implementation of dual ring topology, data packets can be sent in both directions simultaneously. One direction can be designated as the primary transmission direction. Normally, packets will be received from this path. Packets received from the other path will be dropped at the receiver end. However, if there is a disruption in the primary direction, the receiver will receive the packet via the alternate direction. An alternative example may be a star or mesh topology, whereby transmission can proceed from station A to station B either directly or, if the channel separating stations A and B is disturbed, then transmission can proceed through a redundant channel such as from station A to station C and station C to station B.

As used hereinbelow, a transmission path includes two or more alternative transmission channels, where one channel is the primary channel and the other channels can be considered redundant channels. Each channel is deemed either a copper conductor, fiber or wireless transmission medium. In a ring topology, the primary and redundant channels can be formed in a single transmission path around the loop. In a mesh topology, transmission channels can exists between each of n−1 number of stations, where n equals the number of stations within the star. In a mesh topology, transmission channels exist between each pair of n stations. In the star or mesh topology, the redundant transmission channel can be the alternative pathway between two stations via other stations.

In physical fiber optic implementation, a single fiber will consist of multiple strands and each strand consists of multiple Wave Division Multiplex (WDM) channels. A physical cut (or severance) of the fiber will generally result in disruption of services for all channels associated with that fiber. Frequently, this will result in disruption of service in both primary and redundant channels at that point. In a ring topology, there is a significant likelihood that both the primary and redundant channels will be disrupted, rather than a single channel since both channels are typically located next to one another around the ring. For example, both the primary and redundant channels can be clad in a unitary structure, and whenever one is cut it is most likely that the other channel will also be cut thereby rendering useless the entire redundancy feature. Therefore, even though Synchronous Optical Networks ("SONET") employ redundant optical fibers, a disruption of both the primary and redundant fiber can, at the very least, reduce the overall transmission bandwidth or, in the extreme, prevent transmission altogether. Using the former instance and the aforesaid example, if both the left and right fibers are cut between stations A and B, station A can still send information across, for example, the right fiber to station B, and can send packets across the left fiber to an intermediate station upstream of the cut. Unfortunately, packets sent in the left and right fibers are redundant of each other. So, even though the overall bandwidth capacity is 5 Gbits, the maximum bandwidth achievable using the SONET redundant system is 2.5 Gbits. This is due to one set of packets being sent on the left channel and the very same (redundant) set of packets being sent on the right channel.

It would be desirable to introduce a redundant system that does not send the same (i.e., redundant) packets across both left and right channels in a ring topology. Instead, the desired system would use two channels to be routed around the ring or between each mesh- or between most star-configured stations, but allow each channel to be utilized for data transmission. This would maximize the bandwidth capacity of the network or communication system. If each channel is to be utilized, then the desired system should be one which still permits non-redundant transmission to all stations, regardless of where within the network one or both channels are disturbed (i.e., severed, disrupted or otherwise disabled). The improved system, method, architecture, and packet protocol must desirably not only maintain packet transmission speed, but must also note where within the network the severed transmission path exists so as to re-route future packets to avoid the disturbed channel.

SUMMARY OF THE INVENTION

The problems outlined above are in large part solved by an improved packet protocol, communication system, and method, which can determine where, within the communication network, a transmission error exists. The error is defined to arise from a disturbance within that portion of the communication channel that caused the error. Once the disturbance has been determined, then stations adjacent to that disturbance will be noted as the receiving module immediately upstream of the disturbance. As defined herein, a module is a generic term which describes a node which can be represented as a station employing a switch or router, and can forward packets across different physical media. The modules are organized according to some predetermined structure within a given hierarchical level that is reflected in the field of the identification number corresponding to that level. Distributed routing can therefore be achieved by comparing a destination address of a wrapped packet with identification numbers of those hierarchical levels depending on the location of the module receiving the incoming packet. Modules therefore determine the directional flow of the incoming packet based on comparing (or decoding) the destination address of the packet with the relative position of the module indicated by the module's identification number.

In ring and mesh topologies, a transmission path between any two modules preferably contains at least two transmission channels. A single transmission path extends around a ring topology, and one or more paths extend between modules of a star or mesh topology. If the entire transmission path is disturbed between a pair of modules coupled in the ring topology, communication to either of those modules can be maintained provided transmission is sent in the proper direction around the ring. The location at which the transmission path is disturbed can be arrived at by the last module adjacent the disturbance not detecting a null bit pattern for a period of time exceeding that need to transfer a packet. As noted herein, disturbances cause errors in transmission across the network. There are various types of disturbances. For example, disturbances may include not only severance of a channel, but also practices such as a network system administrator setting a node inactive or other error detection and reporting methodologies. Responsive to error/disturbance detection, the receiving module will return the packet through a loop-back conductor of that module to the originating module. The returned packet preferably includes control bits and error identification bits in the header and trailer portions of the packet. The control bits indicate that an error exists (i.e., that the transmission path is disturbed), and thereby informs the originating module to either re-send the packet in an alternative channel in the opposite direction about the loop or, upon unsuccessful retry, drop the packet altogether. The originating module, when receiving the returned packet containing an error value of the control bits, can then forward back an acknowledge bit pattern so as to prevent future "thrashing" that might arise if the originating device was not made aware of and acknowledged the returned error value. In addition, an originating module as well as other modules are made aware of the disturbance and the location of the disturbance for future transmission. Absent an acknowledgment, the originating module would attempt to continuously re-send the packet across the alternative channel or path deleteriously tying up the network. By setting the acknowledge bits to acknowledge a returned error, the originating module can then re-send the packets across one or both channels, but in the opposite direction around the ring, or across another channel across the star or mesh. This allows the network to achieve its full bandwidth transmission capability by maintaining the bi-directional status of each channel and avoiding redundantly sending the same packets across a dedicated left-directed channel and a dedicate right-directed channel, as in a conventional ring network.

According to one embodiment, a packet of information is presented across a communication network. The packet includes control bits and error identification bits that indicate where, within the communication network, a channel disturbance exists. The control bits and error identification bits contain values dependent on which module, within a series of modules connected to the communication network, the disturbance is adjacent. The control bits may include an error value set by the module adjacent to the disturbance and also may include an acknowledge value set by a module within the series of modules that originated the packet. The module adjacent the disturbance can be deemed a receiving module, and the module which originated the packet can be deemed an originating module. Furthermore, the module to which the packet is destined can be deemed a destination module. The receiving module adjacent the disturbance is a module immediately upstream of the disturbance. Therefore, the receiving module is the module closest to the disturbance, and is the last module which receives the packet destined for the destination module which is downstream of the channel disturbance (i.e., severed, disrupted or error-induced channel). The terms "upstream" and "downstream" reflect the direction at which the packets are transmitted across the network and the relative locations of modules relative to the disturbance within that network.

According to another embodiment, a communication system is provided. The communication system includes a transmission path comprising at least two transmission channels. The system also includes a receiving module connected to the transmission path and having a loop back conductor which operably connects one channel to the other channel, and returns the packet containing error bits if the transmission channel or path downstream of the receiving module is disturbed. The error bits returned with the packet by the receiving module may include an acknowledge value set by the originating module whenever the error bits returned from the receiving module indicate the transmission path is disturbed. The acknowledge value is used to instruct the originating module to either drop the packet or re-send the packet in an opposite direction around the loop to which the originating module and destination module are attached. The error bits include one or more unique identification number assigned to the receiving module to note the receiving module was the last of a plurality of modules that received the packet destined for a destination module. Thus, the error value set by the error bits notes that a particular receiving module was the last module not to detect a disturbance. Each module within the overall network is noted above as having a unique identification number. That identification number is assigned based on the hierarchical status of all modules within the structured, distributed routing system hereof.

According to yet another embodiment, a method is provided for transmitting packets across a transmission channel. The method includes forwarding a packet from an originating module, wherein the packet being forwarded is destined for a destination module. The packet can then be received by a receiving module configured between the originating module and the destination module. If the transmission channel is severed between the receiving module and the destination module, the receiving module returns the packet to the originating module with the error bits appropriately set. Thus, the receiving module snoops the packet for absence of a null pattern for a duration that exceeds the time needed to transmit a packet of maximum size allowed in the given protocol. If a null pattern does not exist for the predetermined time duration, it is noted that the receiving module was the last module within the transmission path that received a packet prior to that packet being forwarded to the disturbed channel. The receiving module can then perform its appropriate looping function and appropriately set the error bits. The returned packet contains error bits which indicate an error or transmission path disturbance, and further includes the unique identification number of the last module (i.e, receiving module) immediately preceding, or upstream, the disturbance.

BRIEF DESCRIPTION OF THE DRAWINGS

Other objects and advantages of the invention will become apparent upon reading the following detailed description and upon reference to the accompanying drawings in which.

Figure 1:
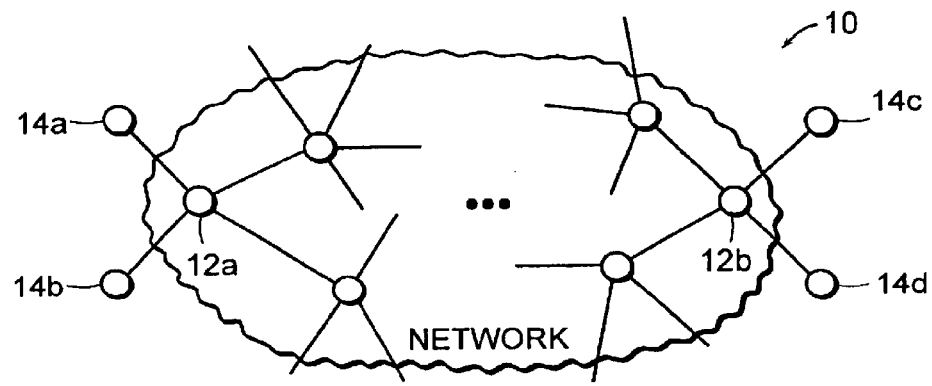
FIG. 1 is a diagram of a set of hierarchically arranged nodes within a network, configured between nodes of another network, or between termination devices.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a communication network 10. Network 10 includes an interconnection of subnets linked by nodes 12. Network 10 can be thought of as one or more intranets interconnected with one another, or interconnected via an internet.

Each node 12 may embody a subnet or a plurality of interconnected subnets. Select nodes 12a and 12b can be used to receive input data into the structured network or transmit output data from the structured network. Nodes 12a and 12b can be connected to external nodes of a conventional network or to termination devices 14.

Figure 2:
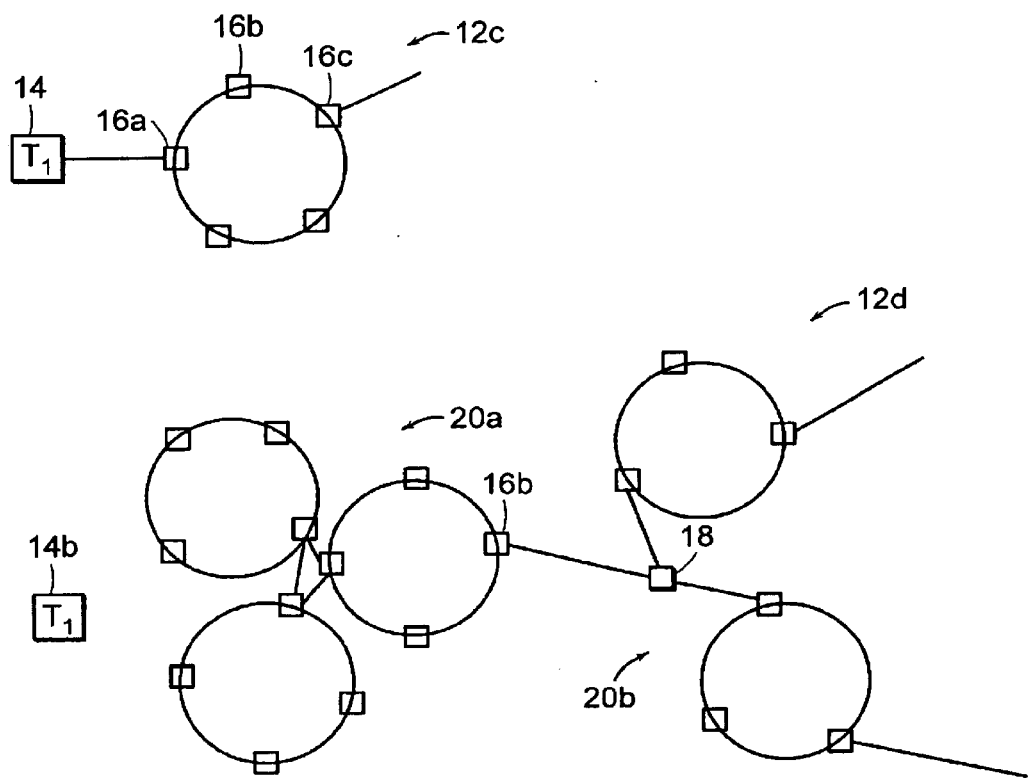
FIG. 2 are diagrams of a node configured according to a single loop, multi-loop, or multiple interconnected multi-loop topology, each configuration having a set of modules interconnected with one another between loops or along a loop, mesh or star topology.

FIG. 2 illustrates exemplary forms of node 12 and, more specifically, modules 16. In the example shown, an entry module 16a receives packets of data from a termination device 14. Node 12c illustrates a node comprising modules interconnected about a ring topography, referred to as a "loop". Along with the entry module 16a are intermediate modules 16b and 16c.

It is recognized that a node or subnet can include either a ring, multi-ring, star or mesh topology, depending on the desired application. The various nodes 12 can be classified as single nodes or multi-nodes, each of which can be an end node, a pass-through, or an intermediate node depending on where within the network they are arranged. The various modules within each node can also be classified as an end module, a pass-through, or an intermediate module based on their position within the network. Further illustrated by node 12c is the inter-relationship between an end module 16a and an intermediate module 16b. An end module 16a is classified as either an entry module or an exit module, depending on whether it receives packets coming into the structured network or transmits packets from the structured network. An intermediate module simply passes the packets from one module to another module, or from one node to another node. Each module is configured can be hardware to be somewhat similar to other modules, dependent only on the number of input and output ports needed by that particular module. Variability is imparted in the way in which the modules are used. An entry module is utilized to wrap the incoming packets, an intermediate module may modify and/or forward the wrapped packets, and an end module strips the wrap information. For a given packet, a module will be configured as entry module if it enters the network via that node. It will be destined to one or more specific destination module/modules. All other modules that the packet can pass through will act as intermediate modules for that packet. Any given module will act as the entry module for packets entering the network through that module, intermediate module for packets passing through that module, and destination module for packets destined for that module. It is understood that the modules access physical media and configuration occurs within registers of each module. A decoder which operates similar to a Media Access Controller ("MAC") discerns the incoming packets based on the destination MAC address using various types of physical media protocol, such as Ethernet, Token Ring, FDDI, or ATM, and can be used in an optical or photonic environment using ring, mesh or star topology.

Node 12d illustrates two multi-loop combinations of modules, the multi-loops are indicated as reference numerals 20a and 20b. Each multi-loop 20 is shown interconnected by an intermediate module 16b. It may be that one or more intermediate modules of the node are configured off the loop, as shown by reference numeral 18. Modules 16 can have almost any number of input and output ports, and can be configured to either wrap an incoming packet, strip an outgoing packet, and/or pass-through the original packet or modified packet (with or without buffering), depending on where the module is in relation to the network topography or termination devices 14.

Figure 3:
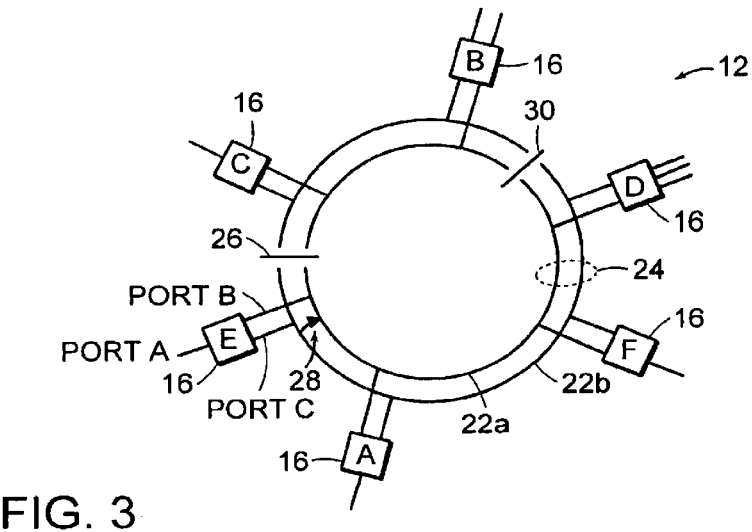
FIG. 3 is a plan diagram of one type of network employing a ring, wherein the ring or loop includes a set of modules connected to a pair of fibers or connected to a pair of conductors or wireless media, each of which are henceforth referred to as transmission channels.

FIG. 3 illustrates a ring topology, whereby multiple modules 16, labeled "A"–"F" are attached to and communicate with two transmission channels 22a and 22b that form a single transmission path 24. The dual transmission channels can be thought of as a redundant system, however, not as in the conventional sense. Instead, the secondary (or redundant) transmission channel 22b can be used if path 22a is severed. Importantly, however, both paths can be used to send dissimilar packets in order to increase two-fold the overall bandwidth of the network. Thus, even though node 12 is represented as a single loop, each loop within the network can also have redundant transmission channels. Similarly even though node 12 is represented as a loop, it can be configured in star or mesh or any other topologies.

In one embodiment, channel 22a can be assumed to be used for data transmission in a counter-clockwise data transmission direction, while channel 22b is used for clockwise data transmission. Thus, any given module will be receiving data from both of its neighbors at all times. In the absence of data, null pattern will be present in both transmission channels. If a given module does not detect null pattern in any one of the incoming transmission channel for a time exceeding the maximum packet size allowed in a given protocol or a preset maximum time from any direction, the module may detect a severance in the transmission channel associated with that direction. A severance can also be detected when any predefined pattern is not detected for a set time, or upon notification of a severance.

FIG. 3 illustrates one example by which the transmission path 24 can be severed at location 26, yet transmission is maintained. In this example, communication from module A to module C will detect the severance at location 26 by module E employing a loop-back path of a packet sent across transmission channel 22b to the destination module C. In one embodiment, modules are designed to detect severance based on absence of null pattern for a preset time, with originating module A forwarding the packet across transmission channel 22b, and the receiving module E pre-conditioned as not receiving the requisite null pattern of 1s and 0s for a time duration that exceeds the time needed to transfer maximum size packet. A null pattern is defined as a pattern normally sent across the network whenever a packet is not being sent. Preferably, the null pattern contains some combination of alternating 1s and 0s in order to sync the clocks in the receiver circuits of the modules. If the pattern forwarded between a pair of modules separated by disturbance contains a pattern not recognizable as the predefined null pattern (i.e., the pattern is all 1s or all 0s) for a duration that exceeds the maximum length of a packet, then it is known that the pair of modules straddle a channel that has been disrupted or severed. For example, a transmitter will normally send alternating 1s and 0s (i.e., transmit a null pattern) whenever a packet is not sent. However, if the channel is severed, then the expected alternating 1s and 0s might become all 1s or all 0s, indicating an error in that channel. As such, in the example shown, receiving module E will return the control bits to the originating module A, indicating a downstream error. In yet another embodiment, module E can detect severance based on other preset condition or by introduction of severance from external source such as network administrator.

The packet received by receiving module E is then returned via feedback path 28 to the originating module A. Since receiving module E was the last module in the path to have detected a severance (i.e., an error downstream thereto), receiving module E returns with the packet both control bits and error identification bits. The control bits are set to indicate a disruption immediately downstream of receiving module E. The error identification bits identify the receiving module E by the identification number assigned to that module. Therefore, the returned packet contains not only indication of a disrupted transmission path, but also the module immediately upstream of that severance. Accordingly, using a feedback path and appending control bits and error identification bits to the packet, allows the present system, packet protocol, and methodology to identify where, within the communication network, a severance exists.

After receiving the returned packet containing control bits and error identification bit values, originating module A sets an acknowledge value within the control bit field. The acknowledge value with note that the packet can be re-sent, however, the re-sent packet must be forwarded across an alternative transmission path. This will avoid originating module A from re-sending the packet to destination module C via receiving module E. Instead, the packet can be re-sent along the right path via modules F, D, and B. Thus, the present methodology tolerates a severance of both the primary and secondary (redundant) transmission channels in a single location. Any further transmission is merely sent in the direction opposite the severance.

Advantageously, since the underlying network is a structured network, entire network can be made aware of the location of any severance. In the example, when module E detects severance 26, it includes its identification number signifying other modules that it is the module immediately downstream of the severance. When a packet is looped back, this information of the severance and its location will be transmitted to other modules in the network. Module A will be made aware of disturbance/severance 26 by the looped back packet from module E. Module A will then send the re-routed packet through the other transmission path 22a along with the information of severance and its location. Modules F, D, and B will pass this packet through while learning about the severance 26. Thus all modules in the network will be made aware of the severance 26 and its location. All modules use this information during routing of all future packets. For example, after being cognizant of the severance, module F will route packets destined to module C via transmission channel 22a and not transmission channel 22b. Packets destined for Module E will be routed through transmission path 22b and not transmission path 22a.

Due to the fact that entire networks can be made aware of any disturbance or severance and its location in the network, packet re-routing is reduced considerably increasing overall bandwidth utilization and reducing network flooding of rerouted packets. Packets need to be rerouted only until modules are made aware of the severance. This will generally be limited to initial few packets immediately following the severance. Packets originating from a module will be directed to cross a severance (situations when packets are directed to module C or beyond on transmission path 22b or packets are directed to module E or beyond on transmission path 22a) only until the first loop back (or re-routed) packet reaches that module. For instance, a re-routed packet from module A is being directed to module C will inform intermediate modules F, D, B, and C about severance 26 and its location immediately upstream of module E. These modules will use this information for all future routing purposes.

Upon fixing or removal of the severance, this information will be transmitted to all nodes and will be reflected in their routing algorithms. The module immediately upstream of the severance will recognize removal of severance. When severance 26 is removed, module E will recognize it for transmission path 22a and will notify other modules upstream. Similarly, module C will recognize and notify all other upstream modules for transmission path 22b.

A network with two transmission paths similar to the one in FIG. 3, can tolerate one severance anywhere in the network without service disruption. Networks with N complete transmission paths can tolerate up to N-1 severances with no service disruption. If a network with two transmission paths has more than one severance at any given time, it can still function partially. For instance, if the network in FIG. 3 has two severances, severance 26 and severance 30, it can still function partially. If module A needs to route a packet to module C and chooses transmission path 22b. Module E will loop back the packet due to severance 26. Module A will re-route the packet along transmission path 22a. When the packet reaches module D, module D will loop back the packet along transmission path 22b due to severance 30 with the indication that the packet has been rerouted from the second severance along with the identification number of module D as the module downstream from the severance for transmission path 22a. When this packet reaches module A, it will be dropped as undeliverable packet as it was re-routed on both available transmission paths. This dropping operation will enable the system to not flood the network with un-routable packets. During the re-routing process modules E, A, F, and D will learn that they are isolated from modules C and B. However, transmission between modules E, A, F, and D will continue. Similarly, modules C and B can communicate with each other but not with modules E, A, F, and D.

Thus with two severances 26 and 30 in a ring topology, the present protocol can detect those locations, but cannot reroute to avoid the severed transmission paths whenever rerouting requires transmission between modules separated by one severance of the pair of severances. If a severance is not interposed between the origination and destination modules, then transmission can occur in its normal course, where non-duplicative packets are sent across both channels to maximize the overall transmission bandwidth.

The same mechanism used to isolate and work around severance of transmission paths can be extended to modules for troubleshooting, maintenance, reconfiguration, and upgrading. For instance, module C can be isolated and brought off-line by inducing severance between modules C and E as well as modules C and B. After the maintenance, module C will be brought online by informing other modules of removal of severance.

Figure 4:
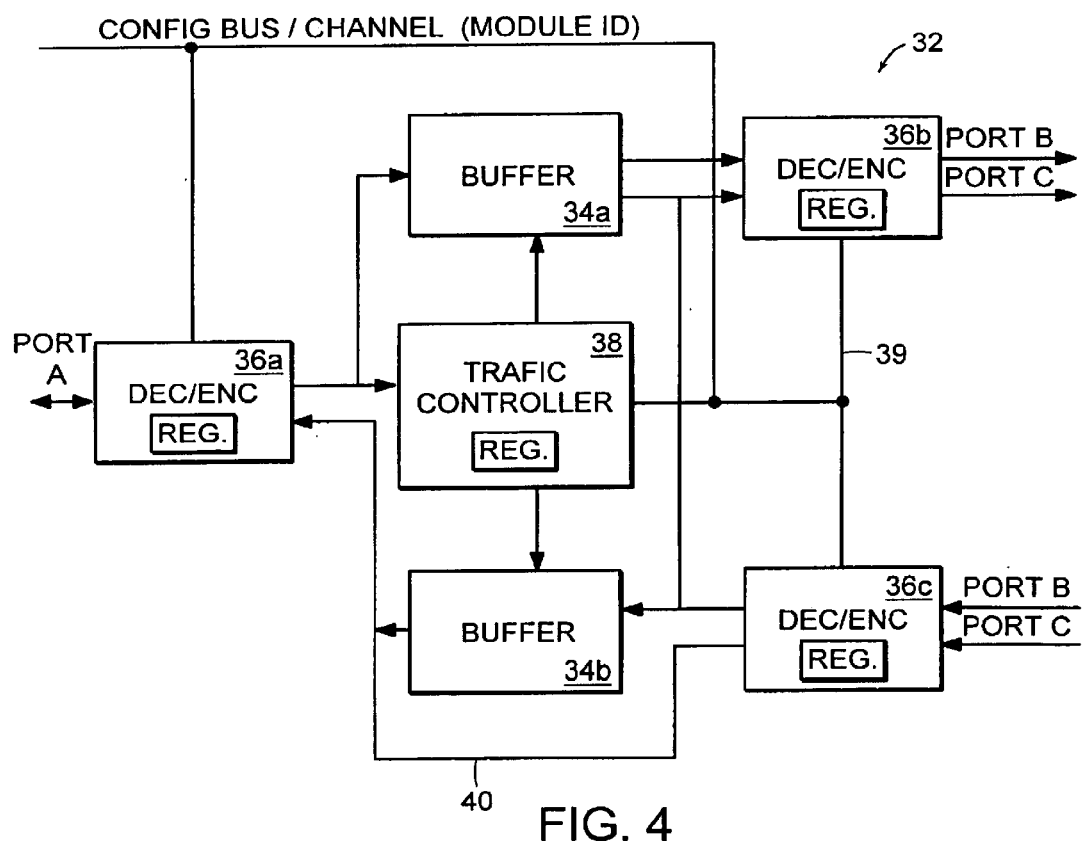
FIG. 4 is a block diagram of a module employed as either an intermediate, pass-through or end module, each of which includes a traffic controller and decoders/encoders that are configured to dispatch control bit values and error identification numbers to packets which traverse the module.

The mechanism by which the feedback path is selectively coupled between redundant channels, and the protocol used to assign module identification numbers to each module is described in reference to FIG. 4. In particular, FIG. 4 illustrates a localized configuration bus or channel that is coupled to various configuration registers contained within decoders/encoders 36 of a traffic manager 32. The traffic manager 32 serves numerous functions, one of which is to optimally route packets of information between input and output ports associated with that traffic manager. The number of input and output ports can vary and the interconnection between certain input ports and certain output ports can also vary depending on the configuration of modules 16. Modules 16 can be called upon to interface with a different physical media than the loop protocol by using a Physical Media Interface ("PMI"). The PMI performs many function, one of which involves the MAC function of moving information across physical hardware conductors based on the physical address of each network interface card within the computer termination devices, and another of which is to synchronize the packets of data being sent or received. If the modules 16 are not used to convert between OSI layers, then the wrapped packet (e.g., a physical media packet wrapped with higher domain protocols) may be directly sent through modules 16 to the appropriate port.

According to the example shown in FIG. 4, each traffic manager 32 can be configured during assembly of the network. Thus, traffic manager 32 can include programmable logic and, more importantly, non-volatile memory. When programmed, the traffic manager 32 will maintain its programmed status unless it is reconfigured. The traffic managers are therefore configurable using known "firmware" program techniques. Such techniques include programmable read-only memory ("PROM"), programmable registers or non-volatile memory, fuses, anti-fuses, etc.

Reconfiguration of traffic manager 32 can take place if, for example, traffic congestion is discovered in a select region of the network. Alternatively, reconfiguration can occur when the network is changed or expanded. Still further, reconfiguration might occur when a section (e.g., subnet) of the network is taken down or deactivated for various reasons. In these instances, one or more traffic managers can be reconfigured in the field or, alternatively, those traffic managers can be selectively reconfigured using a broadcast technique. Reconfiguration signals may be sent from a control processor to various traffic managers 32 that are interconnected to the control processor by a local bus or localized communication link.

Traffic manager 32 functions to direct incoming data to an appropriate output port. It determines the output port for an incoming data packet based on various algorithms. The traffic manager is aware of its position relative to the network and its neighboring traffic managers or nodes. Based on this knowledge, the traffic manager determines the appropriate output port in accordance with the predetermined algorithm. The traffic manager 32 also interfaces between ports of different media, speed, and direction. After the output port assignment is made, the traffic manager can (i) store the data in a local buffer if the incoming data is slower than the speed of the directed-to output port until there is sufficient time to sustain the speed of the output port, (ii) forward the data without an intervening storage if the output port is free or if the incoming data is at the same speed as the output port, or (iii) transfer the data through a FIFO-type storage device when the incoming data is coming at a faster rate than the speed of the output port. The traffic manager also manages resource allocation, such as allocation of various output ports and buffers, and the algorithms make decisions regarding allocation to reduce the latency through the traffic manager.

Traffic manager 32 includes one or more buffers as well as one or more decoders. In the example shown, the buffer can be distributed as two buffers 34a and 34b, and the decoder can be distributed as three decoders 36a, 36b, and 36c. Distribution of the buffers and decoders depends in part on the configuration of the ports. In the example shown, three ports are provided. However, more than three ports and possibly only two ports can be used, wherein the number and distribution of decoders and buffers would correspondingly change. Decoders/encoders 36b and 36c also include parity-add logic and parity-strip logic, as shown. Decoders 36 also include an encode function, and thereby include both decode and encode logic. The register associated with decoders/encoders 36 is configured during a configuration cycle sent across the configuration bus/channel. The configuration information can be broadcast either through a wireless media or across copper or optical fiber connectors to all modules within the network, or a subset of modules on the network. This allows each module to be given (i.e., configured with) a unique identification number that is or can be applied to a packet received by that module. In this manner, the identification number can be imputed upon the packet as returned by the receiving module described above. The network is then configured as it is being assembled, and the identification number can be contained in firmware of each module via the configuration registers or other forms of non-volatile media, for example.

Each port is shown as a bi-directional port and thereby accommodates full-duplex dialogs. The physical media of port A may be different from that of port B or port C, especially if traffic manager 32 is configured within certain portions of the network (i.e., near a termination device or distal from a termination device). Decoder 36a serves to decode addresses within an incoming packet sent into port A, to ensure traffic manager 22 is to receive the packet. Traffic controller 38 can be used to decide whether the packet should be forwarded to output port B or output port C. In many instances, the packet can be forwarded directly from port A to port B (or port C), or is forwarded through buffer 34a. Similar to port A, packets sent to ports B and C can be forwarded to port A, port B, or port C via the decoder of item 36c. Traffic controller 38 includes control signals and address lines extending to each of the buffers and decoders for effectuating optimal routing based on the availability of the destination ports. Coupled in parallel across buffer 34b, may be a series of conductors over which packets can be sent instead of sending those packets through buffer 34b. Thus, incoming packets on port B or port C can be forwarded directly to port A, to port A through buffer 34b, or directly to port B (or port C) as shown in the example of FIG. 3. A connection between ports B and C, for example, can be selectively configured as a bi-directional feedback conductor 39. The same applied between ports A and D, and A and C, as shown by bi-pass conductor 40. Conductors 39, 40, and both in combination, provide direct bi-pass and feedback of packets by receiving module without having to forward the packet through buffers 34 and/or traffic controller 38. This avoids the time consumptive element of storing the information in the buffers and fetching that information from the buffers as they traverse the network. Direct by-pass or feedback can be accomplished by the receiving module from any of the various ports, regardless of the number of ports and how they are configured. By employing configuration registers or non-volatile memory at each port input decoder or encoder, the unique identification number associated with that receiving module can then be placed on the packet as returned to the originating module. In addition to those registers containing module identification numbers, they also contain bits used to enable certain ports in order to fix the forwarding of packets from one port to another. Each register may also be configured to select various ports and paths based on dynamic traffic conditions throughout the network. According to one preferred aspect, the identification number assigned to each module signifies the relative location of that module with respect to other modules in the structured network hierarchy. The identification number of all modules within the network contains bits that are bifurcated into fields and each field corresponds to a particular hierarchical level, according to one example. Thus, the modules can be arranged within the overall network as a structured hierarchy needed to effectuate a distributed routing scheme. In this fashion, a decoder can be configured to decode certain fields above the appending hierarchical level, but not all fields, so as to provide a fast forwarding mechanism.

Decoder 36c, similar to decoder 36a, decodes respective bit fields depending on the identification number to which the incoming packet is targeted. Contained within decoder 36b may be parity add logic, and contained within 36c may be parity strip logic. Parity may therefore be added via a parity generator, and the parity strip logic includes any logic which removes the parity bit generated by the parity generator after having traversed the physical media associated with ports B and C. Thus, traffic manager 32 may impute a parity bit at the output of its respective module prior to sending the packet and associated parity bit across the transmission channel whose input is ports B and C.

Buffer 34a not only temporarily stores the data segment of an incoming datagram from port A, but also contains header and trailer information needed to wrap that datagram. Traffic controller 38 performs a sequence of read or "fetch" operations to buffer 34a. Correspondingly, the read operations occur to specified addresses within buffer 34a to fetch in sequence information needed to wrap the datagram and forward the wrapped datagram, or packet, to decoder 36b. Decoder 36b can then add the module identification number if not previously added by traffic controller 38 and fetching that identification number from its own register or non-volatile memory.

The sequence of read or fetch operations undertaken by traffic controller 38 to buffer 34a produces a particular path, beginning with fetching a null pattern from buffer 34a, fetching a start-of-packet field, fetching a header, fetching data, fetching an end-of-packet field, fetching a trailer, and then finally fetching another null pattern. The sequence of fetch operations are programmably stored within traffic controller 38, and traffic controller 38 fetches from different addressing spaces to formulate a field of bits known as the control bits and error identification bits. The control bits and error identification bits are formed by fetching the appropriate address when compiling the header and trailer portions, respectively, of the packet 60 shown in FIG. 5. Thus, packet 60 is derived from sequentially addressing certain fields of bits within the buffer as well as the data temporarily stored in the buffer, beginning with and ending with a unique null pattern which is normally sent across the network whenever a packet is not present.

If a receiving module, such as module E in the example of FIG. 3, detects a severance, then the encoder assigned to the particular input port of traffic manager 32 will apply an appropriate field of control bits onto the header of a received packet based on what had been programmed into its configuration register. Thus, if an error is to be programmed, then the configuration register of the appropriate input port encoder may be programmed with a "01" value, as shown by the control bit field 62 of FIG. 6. However, there may be instances in which an error is not detected (i.e., a downstream disturbance does not exist), then the configuration register will be programmed to impute a "00" bit field onto the returned packet, as shown by the control bit field 62 of FIG. 6.

The control bit field 62 can also be reserved to indicate an acknowledgement of error set by the originating module after having received back the packet containing the error value "01" from two receiving modules placed immediately upstream two disturbed or severed paths. The acknowledge bit value "10" will note that the originating module should not attempt to re-send the packet since all alternative paths are severed and, instead, should simply drop the packet. The originating modules drops the packet upon setting the control bits to "11."

Figures 5, 6:
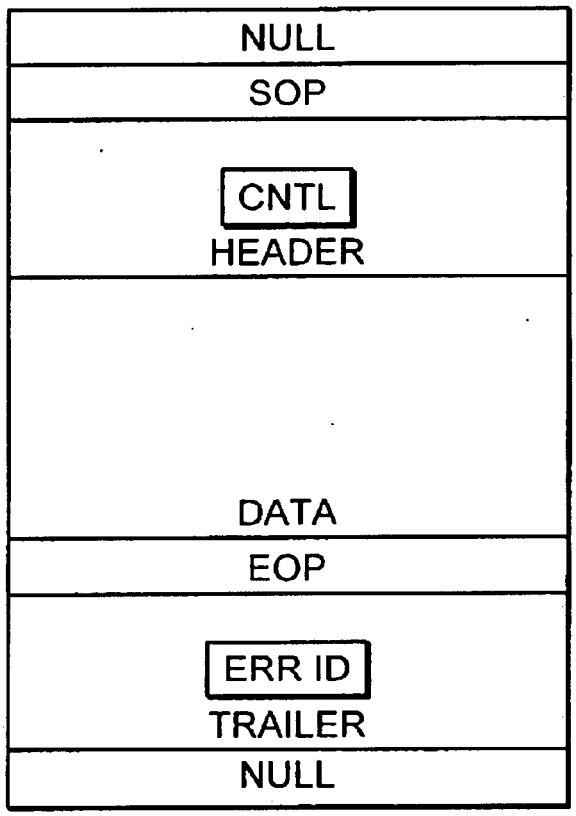
FIG. 5 is a plan diagram of the packet compiled by a series of fetch operations to the buffers shown in FIG. 4, wherein a control field of bits and an error identification field of bits contained within the header and trailer identify the location of a disturbed transmission path, or individual transmission channels which form a path.
FIG. 6 is a plan diagram of the control field of bits used to note and acknowledge an error, and maintain efficient transfers even though an error (e.g., ring, star or mesh transmission path or channel disturbance) has occurred.

FIG. 5 illustrates an error identification bit field contained within the trailer portion of the packet 60, according to one example. The error identification bit field is merely reserved to be programmed based upon the module identification number of that receiving module immediately upstream of the disturbed (i.e., corrupted, disabled, or severed) transmission path, or upstream of the disturbed transmission channel. Thus, the configured identification number within module E, of the example shown in FIG. 3, will be placed within the error identification bit field shown in FIG. 5 as the packet is returned to the originating module A. In this manner, the originating module A will know that the packet can be resent to all modules downstream of the receiving module, but should be resent in a counter-clockwise fashion, rather than the exemplary clockwise route. The originating module, like all modules in the structured, hierarchical network, knows not only its identification number, but all other module identification numbers within the network. Therefore, the originating module A will know the relative placement of all other modules connected to that loop, or across any loop within the network.

Similarly, control word of header of 60 in FIG. 5 can have one or more bit used to broadcast removal of severance information. Associated with this bit, trailer of the packet can have error removal identification number that notifies other modules to remove specific severance.

Figure 7:
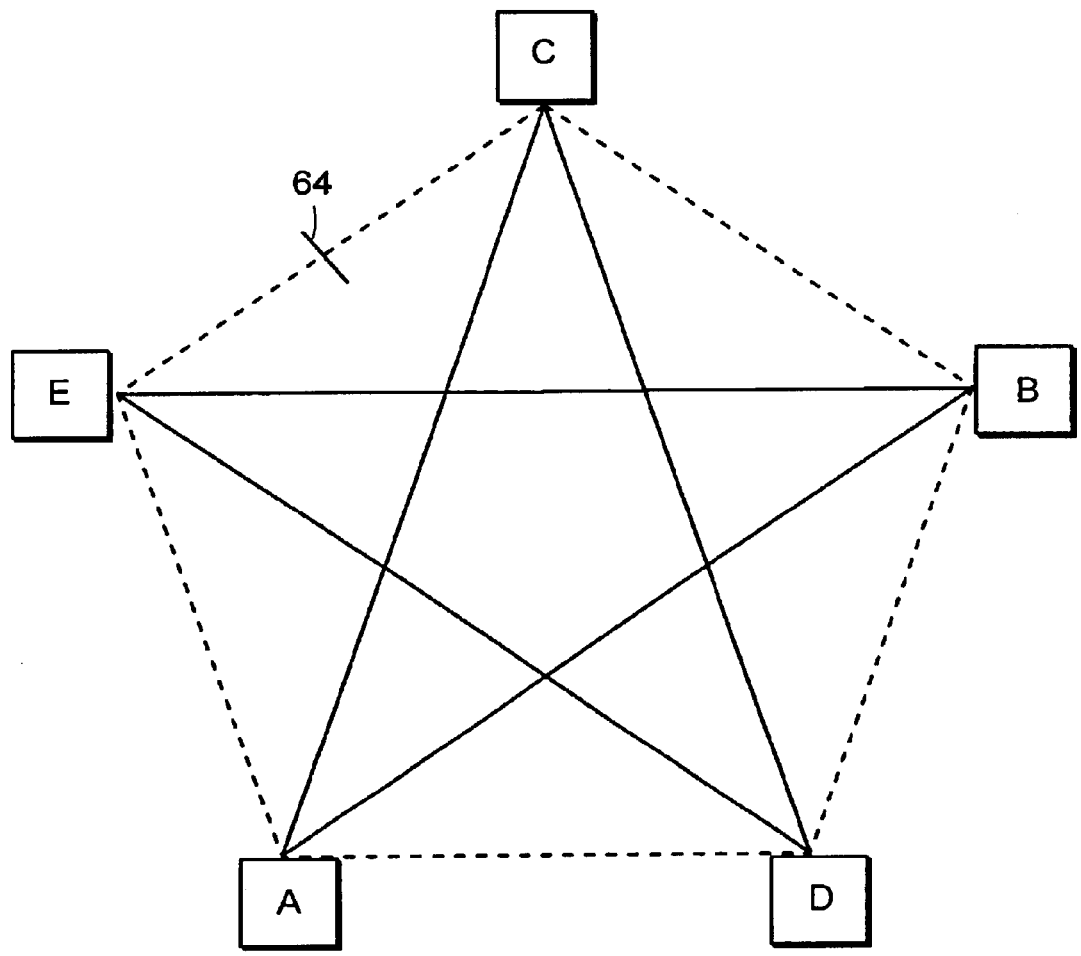
FIG. 7 is a plan diagram of a mesh or star topology of multiple modules interconnected with one another and employed to send and receive error control bits and error identification bits within packets forwarded across the topology.

In the example of FIG. 3, a loop is shown. However, it is understood that the present packet protocol, system and method can also be applied to a star or mesh topology. FIG. 7 illustrates a star topology in solid line, and mesh by a combination of solid and dashed lines, wherein alternative channels exist between modules to form a transmission path between modules. For example a channel between modules E and C can be disturbed, as shown by reference number 64. The transmission path between modules A and C can therefore be redundantly shown as primary channel A to E to C, or as secondary channel A to C. An error can be detected by receiving module E, and the appropriate control and error identification bits are set and returned to originating module A. Module A can then re-send the packet to module C via the alternative, direct channel between modules A and C. If, for example the direct channel is also disturbed, then originating module can set the acknowledge bit value and send the packet on any other alternative paths such as A to D to C or A to D to B to C. If this case, the number of error bits will be a function of number of alternate paths. If all paths are severed only then the packet will bedropped. The same principles that apply to a ring topology are therefore equally applicable to the star or mesh topology, except that the pair of channels which for a transmission path are separated in a star or mesh topology, whereas they generally extend adjacent and parallel to one another in a ring topology.

It will be appreciated to those skilled in the art having the benefit of this disclosure that the various embodiments-herein are believed to be capable of performing fast and efficient data transmission across network and/or ring topology that has been severed across both transmission channels of a redundant transmission path. Moreover, the various embodiments illustrate a mechanism for returning a packet which indicates the location at which the transmission path or channel has been disabled or severed, and allows the originating module to re-send using an alternative route. Also, in each instance, the transmission channels are bi-directional to effectuate maximum bandwidth efficiency. In a structured network, any disturbance and its location is made available to the entire network thus reducing flooding of network with re-routed packets. Various modification and changes may be made as would be obvious to a person skilled in the art having the benefit of this disclosure. It is intended that the following claims be interpreted to embrace all such modifications and changes. Accordingly, the specification and drawings are to be regarded in an illustrative rather than restrictive sense.

What is claimed is:

1. A communication system, comprising:
   at least two transmission channels; and
   a receiving module connected to the transmission channels and having a loop-back conductor which operably connects the two transmission channels and returns a packet containing error bits if one or more of the transmission channels downstream of the receiving module is disturbed, wherein the error bits comprise an error value set by the receiving module if the receiving module fails to receive a null pattern for a length of time exceeding that which is used to send a packet.

2. The communication system as recited in claim 1, wherein the two transmission channels comprise a pair of optical fibers, copper conductors or wireless communication channels.

3. The communication system as recited in claim 2, further comprising an originating module connected to the transmission path and adapted to originate the packet destined for a destination module also connected to the transmission path immediately downstream of the receiving module.

4. The communication system as recited in claim 3, wherein the error bits comprise an acknowledge value set by the originating module whenever the error bits returned from the receiving module indicate the transmission path is severed, and wherein the acknowledge value is used to instruct the originating module to access an alternative transmission channel.

5. The communication systems as recited in claim 1, wherein the loop-back conductor is selectively configured directly between ports of the receiving module, said ports comprising registers configured to apply the error bits having values dependant on whether the transmission path downstream of the receiving module is disturbed.

6. The communication system as recited in claim 1, wherein the error bits indicate if at least one of the communication channels is occupied such that an alternate communication channel should be selected for transmission.

7. A method for transmitting packets across a transmission path, comprising:

forwarding a packet from an originating module that is destined for a destination module;

receiving the packet at a receiving module configured between the originating module and the destination module, wherein said receiving comprises snooping the packet for absence of a null pattern beyond a predetermined length of time and thereafter performing said returning step; and returning the packet containing error bits to the originating module from the receiving module if the transmission path is disturbed between the receiving module and the destination module.

8. The method as recited in claim 7, wherein said returning comprises looping back the packet containing the error bits form one transmission channel to another transmission channel.

9. The method as recited in claim 7, further comprising receiving the returned packet by the originating module and acknowledging the value of the error bits in order for the originating module to either drop the packet or re-send the packet in an opposite direction across the transmission path.

10. A communication system, comprising:

at least two transmission channels; and a receiving module connected to the transmission channels and having a loop-back conductor which operably connects the two transmission channels and returns a packet containing error bits if one or more of the transmission channels downstream of the receiving module is disturbed, wherein the error bits comprise a unique identification number assigned to the receiving module to note the receiving module was the last of a plurality of modules that received the packet destined for a destination module dissimilar from and located downstream of the receiving module.

11. The communication system as recited in claim 10; wherein the two transmission channels comprise a pair of optical fibers, copper conductors or wireless communication channels.

12. The communication system as recited in claim 11, further comprising an originating module connected to the transmission path and adapted to originate the packet destined for a destination module also connected to the transmission path immediately downstream of the receiving module.

13. The communication system as recited in claim 12, wherein the error bits comprise an acknowledge value set by the originating module whenever the error bits returned from the receiving module indicate the transmission path is severed, and wherein the acknowledge value is used to instruct the originating module to access an alternative transmission channel.

14. The communication system as recited in claim 10, wherein the loop-back conductor is selectively configured directly between ports of the receiving module, said ports comprising registers configured to apply the error bits having values dependant on whether the transmission path downstream of the receiving module is disturbed.

15. The communication system as recited in claim 10, wherein the error bits indicate if at least one of the communication channels is occupied such that an alternate communication channel should be selected for transmission.

16. A method for transmitting packets across a transmission path, comprising:

forwarding a packet from an originating module that is destined for a destination module;

receiving the packet at a receiving module configured between the originating module and the destination module; and returning the packet containing error bits to the originating module from the receiving module if the transmission path is disturbed between the receiving module and the destination module, wherein said returning comprises setting the error bits indicating the receiving module was the last of a series of modules that fails to receive the null pattern.

17. The method as recited in claim 16, wherein said returning comprises looping back the packet containing the error bits from one transmission channel to another transmission channel.

18. The method as recited in claim 16, further comprising receiving the returned packet by the originating module and acknowledging the value of the error bits in order for the originating module to either drop the packet or re-send the packet in an opposite direction across the transmission path.

* * * * *

UNITED STATES PATENT AND TRADEMARK OFFICE
CERTIFICATE OF CORRECTION

PATENT NO. : 6,912,196 B1 Page 1 of 1
DATED : June 28, 2005
INVENTOR(S) : Mahalingaiah It is certified that error appears in the above-identified patent and that said Letters Patent is hereby corrected as shown below:

Column 15,
Line 17, delete "form" and substitute -- from --.

Signed and Sealed this

Fourth Day of April, 2006

JON W. DUDAS
*Director of the United States Patent and Trademark Office*